United States Patent [19]

Makabe et al.

[11] 4,381,721

[45] May 3, 1983

[54] ELECTRONIC SEWING MACHINE

[75] Inventors: Hachiro Makabe, Kanagawa; Haruhiko Tanaka, Mitaka, both of Japan

[73] Assignee: Janome Sewing Machine Co. Ltd., Tokyo, Japan

[21] Appl. No.: 315,985

[22] Filed: Oct. 28, 1981

[30] Foreign Application Priority Data

Oct. 31, 1980 [JP] Japan ................. 55/152266

[51] Int. Cl.³ .......................................... D05B 3/02
[52] U.S. Cl. ............................................... 112/158 E
[58] Field of Search .......... 112/158 E, 121.11, 121.12

[56] References Cited

U.S. PATENT DOCUMENTS 4,266,493  5/1981  Hanyu et al. ................. 112/158 E
4,326,473  4/1982  Kigawa ......................... 112/158 E Primary Examiner—Peter P. Nerbun
Attorney, Agent, or Firm—Michael J. Striker

[57] ABSTRACT

This invention relates to an electronic sewing machine with which stitch patterns can be formed according to stitch control signals stored in electronic memory means, and more particularly to stitch pattern control means for such an electronic sewing machine.

1 Claim, 5 Drawing Figures

FIG_1(A)
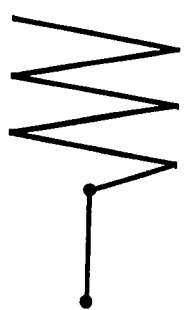
FIG_1(B)
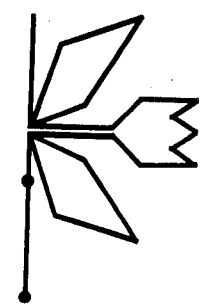

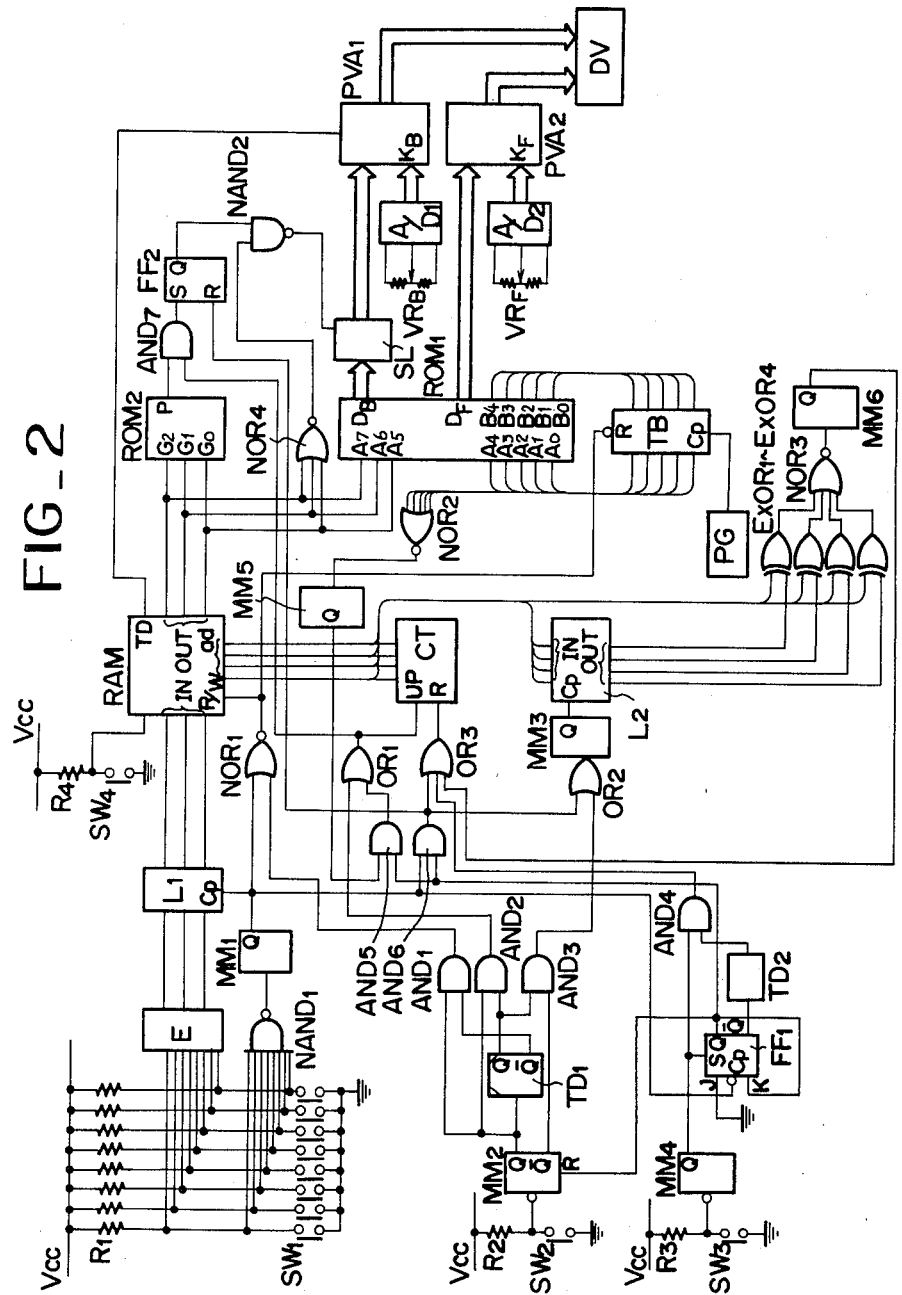
FIG_2

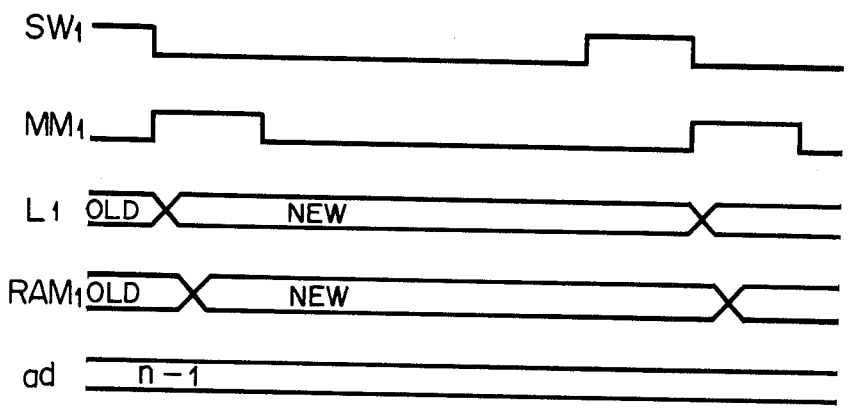
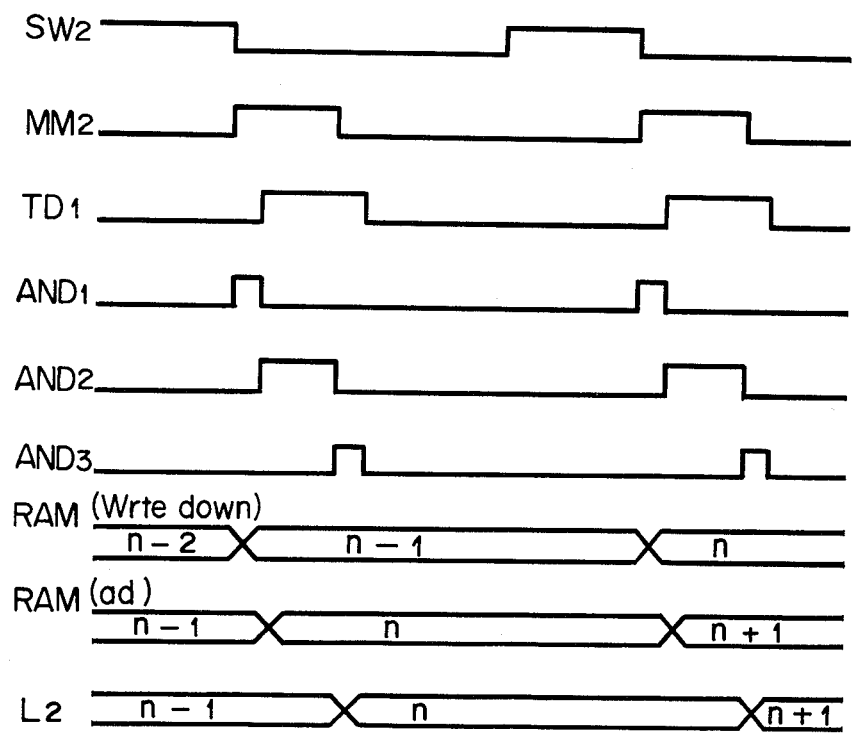

ELECTRONIC SEWING MACHINE

SUMMARY OF THE INVENTION

In sewing machines in which data of a plurality of stitch patterns which can be inverted with respect to a center line corresponding to a center of the maximum needle amplitude, are stored to form combination of stitch patterns, a basic line of adjustment of the stitch pattern width is required to be a middle (M) basic line. In such a sewing machine, if it is desired to form the combination of stitch patterns by providing a straight stitch of a plurality of stitches between two stitch patterns, it is sometimes felt that it is not suitable from appearance to set the line of the straight stitch as mentioned above to M basic line. Accordingly, it is sought to permit designation of a co-ordinate of the line of the straight stitch suitable to a selected combination of the stitch patterns.

When forming stitch patterns by designating and storing instructions such as to alternately form inverted and non-inverted stitch patterns, there is no problem if the needle amplitude control is made such that provide the maximum needle amplitude, but if the inverted and non-inverted stitch patterns tend to converge to the left (L) and right (R) basic lines respectively in dependence upon the needle amplitude control, it is desired because the alignment of the individual stitch patterns is lost. To eliminate this drawback, it is contemplated to permit both the inverted and non-inverted stitch patterns to be formed with respect to and converge to M basic line.

In such sewing machine as mentioned above where stitch patterns can be inverted, if it is specified to form a combination stitch pattern by providing a straight stitch consisting of a plurality of stitches connecting two stitch patterns, the line of the straight stitch is constantly set to M basic line. This gives rise to no problem for a usual symmetrical pattern with respect to M basic line as shown in FIG. 1(A). However, with a pattern where a straight stitch extending in the direction of fabric feed is provided along L basic line such as a tulip pattern as shown in FIG. 1(B), setting of the straight line to M basic line is undesired from appearance.

The invention is contemplated to solve the problems mentioned above and seeks to provide a sewing machine in which usual independent stitch patterns are controlled to M basic line, comprising a first memory in which stitch control data for a plurality of different stitch patterns including a straight stitch is permanently stored, a stitch pattern selector rendered operable with operation of a switch, a memory operating section operated concurrently with the switch operation for specifying a plurality of stitch patterns in combination, a second memory for memorizing the kind and formation order of the stitch patterns in the combination pattern on the basis of operation of the stitch pattern selector and memory operating section, a third memory for storing unit stitch patterns depending upon whether a unit stitch pattern is a usual symmetrical pattern with respect to M basic line or a particular pattern such as one containing a straight stitch extending in the direction of fabric feed along the left or right basic line, for instance a tulip pattern, thereby to produce group signals for the corresponding unit stitch patterns constituting the specified combination stitch pattern, a register for receiving the group signals and registering each of them according to a predetermined priority order of a usual stitch pattern group and a pattern group to determine the co-ordinate of the line of a straight stitch portion contained in the specified combination stitch pattern, and a processor unit for receiving stitch control data and a signal from the register and executing processing to convert with preference the stitch control data for determining the co-ordinate of the straight stitch line into a co-ordinate corresponding to a specific position of a stitch pattern if said stitch pattern is a particular stitch pattern during the execution of the formation of the straight stitch pattern in said combination stitch pattern while controlling the basic line of a stitch pattern to M basic line if the stitch pattern is a usual stitch pattern.

BRIEF DESCRIPTION OF THE DRAWINGS

FIGS. 1A and 1B are views showing examples of stitch patterns available in an embodiment of the invention, FIG. 2 is a control circuit diagram for the invention, and FIGS. 3 and 4 are timing charts for explaining the operation of the control circuit in FIG. 2.

DETAILED DESCRIPTION OF THE INVENTION

An embodiment of the invention will be described with reference to the attached drawings. FIG. 1(A) is a combination of stitch pattern composed of a zigzag stitch pattern symmetrical with respect to the M basic line and straight stitch formed along the M basic line continued thereto. FIG. 1(B) is a combination of stitch pattern of a tulip pattern including straight stitch part formed along L basic line* following the tulip pattern. L and R basic lines respectively position on the leftmost and rightmost limits of the needle amplitude and correspond to respective signals 0 and 30. M basic line is middle between the limits and correspond to a signal 15.

*and straight stitch formed along L basic line

FIG. 2 shows a control circuit diagram for automatically forming these patterns, wherein SW1 is a plurality of pattern selecting switches, and when one of them is pushed, an encoder E provides a 3-bit code proper to the selected pattern, and give an output to a latch circuit L1. Vcc is a plus control power supply, and R1 is a pull-up resistor. MM1 is a monostable multivibrator circuit which receives a signal from the switch SW1 via NAND circuit NAND1, and gives the signal from an output terminal Q to a trigger terminal Cp of the latch circuit L1, whereby the aforementioned code signal by the operation of the switch is latched therein. RAM is a random access memory serving as a second memory which stores data of an input terminal IN thereof in a memory column specified by a 4-bit address ad according to a write instruction of a mode designating terminal R/W, and issue an output from an output terminal OUT according to a read instruction. ROM1 is a read-only memory serving as a first memory which stores a stitch control signal of each of stitch patterns, and directly and indirectly receives a code signal representing the selected stitch pattern from switch SW1 from an output terminal OUT of the memory RAM to address terminals A5 to A7 of address terminals A0 to A7. SW2 is a selected pattern storing switch which actuates the monostable multivibrator circuit MM2 by a falling signal by the operation, and gives an output Q of a true side thereof to a delay circuit TD1, and is connected to an input of NOR circuit NOR1 via AND circuit AND1 which receives said true side output and an output $\overline{Q}$ of complement side of the delay circuit TD1. R2 is a pull-up resistor. NOR circuit NOR1 also receives a signal from the output terminal Q of monostable multivibrator circuit MM1, and its output is coupled to the terminal R/W of the memory RAM, whereby the signal from the latch circuit L1 is stored or rewritten with respect to the memory RAM per each of operations of the switches SW1 or SW2. When any switch is operated, the terminal R/W is maintained high (H) level as a read instruction. When a switch is operated, the terminal R/W is temporarily held low (L) level as a write instruction. After a later mentioned counter CT advances the address of the memory RAM by the switch SW2, data by the switch SW1 is written in a new address. If the switch SW1 is repeatedly operated without operation of the switch SW2, the data is rewritten in an indication by the latest operation. The counter CT is separately reset when the control power supply is closed, and receives, at a count-up terminal UP, the output of AND circuit AND2 which receives the true side outputs Q of the monostable multivibrator MM2 and the delay circuit TD1 via OR circuit OR1, and is counted up after operation of the switch SW2. Latch circuit L2 receives at an input terminal IN the count signal of the counter CT. The latch circuit also receives, at a trigger terminal Cp, the signal from the switch SW2 via AND circuit AND3 which receives the complement output $\overline{Q}$ of the monostable multivibrator circuit MM2 and the true side output Q of the delay circuit TD1 and via OR circuit OR2 and the monostable multivibrator circuit MM3, for latching the count-up signal of the counter CT by operation of the switch. Timing buffer TB which resets a terminal R connected to the output side of the NOR circuit NOR1, renders an output 0 per each of operations of the switches SW1 and SW2, and renders 0 the address inputs A0 to A4 of the memory ROM1 connected thereto. The timing buffer receives, at the terminal Cp, as a trigger signal a signal of synchronization signal generator PG, generating pulse signal in synchronism with the rotation of an upper shaft (not shown) of the sewing machine, whereby address signal B0 to B4 from the memory ROM1 is latched to advance the address per every stitch. The control in relation with these memory ROM1 and timing buffer TB is basically the same as in Japanese patent application No. 124,306/75 filed by the same applicant.

The memory ROM1 supplies a needle amplitude control signal DB to a processor PVA1 through a switching circuit SL and also supplies a feed control signal DF to a processor PVA2. These processors respectively receive control signals supplied as contraction factor signals KB and KF from the needle amplitude control VRB and the feed control VRF through analog-digital converters A/D1 and A/D2, and execute a later mentioned processing including multiplications of the control signals DB and DF by these respective data, and issue to a pattern forming device DV. With respect to the needle amplitude control signal DB, the data 0 designate co-ordinate or R in FIG. 1 and the data 30 designate co-ordinate on L, and thus the distance between L and R is divided into 30 sections. With respect to the feed control signal DF, the data 0 specifies the maximum reverse feed and the data 30 specifies the maximum forward feed. For the straight stitch, the same data corresponding to six addresses are stored as unit of consecutive six addresses (in this case, the data DB is 15).

A control switch SW3 is closed at start of a speed controller, and actuates a monostable multivibrator circuit MM4 with falling signal produced by this operation. R3 is a pull-up resistor. The monostable multivibrator circuit MM4 gives its true side output Q to the set terminal S of J-K flip-flop circuit FF1, and the flip-flop is set when the switch SW3 is operated. The flip-flop FF1 has a terminal J connected to ground (at L level) and a terminal K connected to its true side output terminal Q. It receives the output Q of the monostable multivibrator at its trigger terminal Cp and is reset by its falling. The output of the delay circuit TD2 which is actuated by receiving the complement output $\overline{Q}$ of the flip-flop circuit, and the output of AND circuit AND4 which receives the output of the monostable multivibrator circuit MM4, are led through OR circuit OR3 to the reset terminal R of the counter CT. The counter CT is reset when the switch SW3 is first operated after operation of switch SW1. The true side output Q of the flip-flop FF1 is also led to the reset terminal R of the monostable multivibrator circuit MM2 and to one input terminal of each of AND circuits AND5 and AND6. The address signals A0 to A4 of the memory ROM1 are 0 for the first stitch, and at this time the monostable multivibrator circuit MM5 is actuated through NOR circuit NOR2. The output terminal of this monostable multivibrator circuit is connected to the other input terminal of AND circuit AND5, and the output terminal of this AND5 is connected through the OR circuit OR1 to the count-up terminal UP of the counter CT, whereby count-up of the counter is advanced every time a new unit stitch pattern is started. The AND circuit AND6 receives at its other input terminal the output Q of the monostable multivibrator circuit MM1 and resets the counter CT via OR circuit OR3 when the switch SW1 is reset after the operation of the switch SW3 while the count 0 of the counter CT at this time is latched in the latch circuit L2 via OR circuit OR2 and the monostable multivibrator circuit MM3. Exclusive OR circuits ExOR1 to ExOR4 compare the output signal of the counter CT and those of the output signal of the latch circuit L2 per each of corresponding bits, and when all the compared bits coincides with the mating bits, monostable multivibrator circuit MM6 is actuated through NOR circuit NOR3, and the counter CT is reset by the output Q of the monostable multivibrator circuit coupled through the OR circuit OR3 to bring about a state corresponding to a first unit stitch pattern of combination of the stitch patterns.

Read-only-memory ROM2 serves as a third memory to receive at terminals G0, G1, G2 the code signal representing a stitch pattern from the output terminal OUT of memory RAM, and to provide at an output terminal P a signal for grouping stitch patterns according to the received code signal as will be described. The grouping signal is at a low (L) level in response to a stitch pattern as shown in FIG. 1(A), including straight stitch and is at a high (H) level in response to a special pattern as shown in FIG. 1(B) such as a tulip pattern having a straight stitch formed along R basic line following the tulip. Flip-flop FF2 is reset by operation of the switch SW1 after operation of the switch SW3. It receives as its set terminal S the output signal from AND circuit AND7, which receives the output P of the memory ROM2 and the output of the OR circuit OR1, to provide output P at H level as a pattern designation signal depending upon operation of a pattern selecting switch SW1, and it is reset when the selected pattern storing switch SW2 is subsequently operated. That is, in the operation of storing a plurality of stitch patterns in the memory RAM, if a special pattern as mentioned above is included, the output at its output terminal Q goes to H level while remaining at L level if no special stitch pattern is contained. NAND circuit NAND2 receives the output Q of the flip-flop FF2 and the output of NOR circuit NOR4 receiving the outpur OUT of the memory RAM and provides its output as a switching signal to the switching circuit SL. During the straight stitch by operation of switch SW1, the code specifying this designation provided as the output OUT of the memory RAM is 0 0 0 (not showing correspondence to selection of the straight stitch) to provide for a signal of 1 as one input to the NAND circuit NAND2. During stitching other patterns than the straight stitch, the code provided as the output OUT contains 1 to provide for a signal of 0. Thus the NAND circuit NAND2 provides a switching signal of 1 to the switch circuit SL during sewing patterns other than the straight stitch, and while during the straight stitch, if the output Q of the flip-flop is 1, 0 is given to the switch circuit SL, and if it is 0, 1 is given thereto. If the switching signal is 1, the switching circuit SL supplies the needle amplitude control signal DB of the memory ROM1 to needle amplitude control processor PVA1, while supplying data 0 as the needle amplitude control signal if the switching signal is 0. The needle amplitude control processor PVA1, which receives the needle amplitude control signal DB or equivalent data 0 (which is also designated with DB in the following formula) from the switching device SL and also receives the needle amplitude contraction factor signal KB, executes processing for "(DB-15)×KB-15" and supplies the result to the stitch pattern forming unit DV. The feed control processor PVA2 receives the feed control signal DF and feed contraction factor signal KF to execute processing for "DF×KF" and supplies the result to the stitch pattern forming unit DV. Switch SW4 is an inversion switch. When it is operated prior to operation of a stitch selecting switch SW1, it supplies an instruction to invert a subsequently selected stitch pattern with respect to M basic line. When the inversion switch is operated, the memory RAM provides an inversion instruction signal from an output terminal TD. With this inversion instruction signal received, the needle amplitude control processor PVA1 execute processing for "$\overline{DB}$=30-DB" where $\overline{DB}$ is an inverted pattern control signal. Resistor R4 is a pull-up resistor.

The operation of the circuit structure described above and shown in FIG. 2 will be explained with reference to FIGS. 3 and 4. Assume that the tulip pattern as shown in FIG. 1(B) is selected by operating the corresponding pattern selecting switch SW1. The falling signal produced thereby actuates the monostable multivibrator MM1, whereupon an old data OLD in the latch circuit L1 is changed to a new data NEW. The data in the read-only-memory RAM is also rewritten to a new data. The address at this time is, for instance, "n−1". Since the flip-flop FF1 is reset by the switch operation, the AND circuit AND6 nullifies the switch signal. That is, the counter CT is not reset, and no count-up input appears. Then, when the selected pattern storing switch SW2 is once operated for storing,** the falling signal from the switch actuates the monostable multivibrator circuit MM2, causing the circuit to generate a pulse signal while rendering the delay circuit TD1 operative to cause the delay circuit to generate a pulse of the same width as that of the monostable multivibrator circuit MM2. With the combination of these two pulse signals, the AND circuits AND1, AND2, AND3 issue in succession pulses as shown in FIG. 4. With the rising signal from the AND circuit AND1 the mode designating terminal R/W of the memory RAM is rendered to the L level, whereby the same data as mentioned is again stored in the memory column, the address of which is "n−1" as mentioned. With the subsequent rising signal from the AND circuit AND2 the counter CT is caused to effect one count-up, whereby the address of the memory RAM is shifted to "n". With the subsequent rising signal from the AND circuit AND3 the output data "n" of the counter is latched in the latch circuit L2. When a pattern selecting switch SW1 for specifying the zigzag stitch pattern is subsequently operated, a corresponding specified signal is latched in the latch circuit L1. When the storing switch SW2 is operated, the write instruction is supplied through the AND circuit AND1 and NOR circuit NOR1 to the memory RAM whereby the aforementioned specified signal is stored in the address "n" while the counter CT is counted up to cause to shift the address to "n+1". With switches SW1 and SW2 repeatedly operated, the signals are successively written in the memory RAM while the address is shifted in the manner as described above. The total number of specified unit stitch patterns is latched in the latch circuit L2. In the instant embodiment, the two stitch patterns as said above are stored. When the tulip pattern is selected, the output signal P of the memory ROM2 is H level, and a signal subsequently generated with the operation of the switch SW2 sets the flip-flop FF2 via the AND circuit AND2, OR circuit OR1, and AND circuit AND7. When the straight stitch is selected, one input to the AND circuit AND6 goes to H level, but the flip-flop FF2 is not reset since the flip-flop FF1 is reset. Thus, after selecting and storing the first stitch pattern, one input to the NAND circuit NAND2 is held H level.

**In the instant case, the straight stitch pattern in order to form a combination stitch pattern, When the controller (not shown) is operated, the flip-flop circuit FF1 is set with the operation of the switch SW3 in the first operation. The counter CT is reset, and the address of the memory RAM becomes 0. This address corresponds to the leading address in the stitch controlling data memory ROM1 for the tulip pattern by the first operation of the switch SW1 in the explanation of the instant description and this has been described as the address "n−1" in connection with FIG. 4. The code for this address contains 1, and renders 0 the other input to the NAND circuit NAND2. Thus the switching circuit SL receives 1 as a switching signal, and outputs the needle amplitude control data DB from the memory ROM1. This memory is providing the data DB and DF for controlling the needle amplitude and the feed control, which read out from the leading address for designating the tulip pattern as designated by the bits A5 to A7 in the address signal A0 to A7 (other bits being 0), and the processors PVA1 and PVA2 receive these data and the contraction factor data KB and KF provided from the respective needle amplitude and feed controllers VRB and VRF corresponding to the data DB and DF. The processor PVA1 executes processing for "(DB−15)×KB+15" and supplies the result to the pattern forming unit DV.

When the sewing machine is driven, a synchronizing signal generator PG generates a pulse signal for each rotation of the sewing machine. The address data B4 to B0 which is output together with the data DB and DF according to the aforementioned leading address read out by the first pulse, are latched in a timing buffer TB and provided as the address A4 to A0 for a second stitch. In this way, a stitch is formed for every rotation of the sewing machine. The address data B4 to B0 are 0, which are coupled with the data DB and DF for the last stitch of the unit pattern, and the counter CT is counted up. The memory RAM designates the leading address of the straight stitch to the memory ROM2.

The output OUT of the memory RAM is 0 0 0 to said address which is coupled through the NOR circuit NOR4 and NAND circuit NAND2, providing a switching signal of 0 to the switching circuit SL. Thus, DB in the said operation formula "(DB−15)×KB+15" is made 0, causing the processor PVA1 to execute processing for "−15×KB+15" and supplying the result to the pattern forming device DV. The result is 0 when the contraction factor KB provided by the needle amplitude controller VRB is 1 while being 15 when the contraction factor is 0. This means that, in the tulip pattern given by the operation formula "(DB−15)×KB+15", when the contraction factor KB is 1, the straight stitch following thereto is 0 on L basic line, as shown in FIG. 1(A), and if the contraction factor is 0, the straight stitch is 15. The counter CT is counted up and when the count coincides with the number stored as the total number of unit stitch patterns in the latch circuit L2, the monostable multivibrator circuit MM6 is actuated to reset the counter CT. The formation of the first tulip stitch pattern again begins to repeat the formation of the combination stitch pattern. The operation concerning the fabric feed control is not described because it is not necessary for understanding the contraction according to the invention.

When the zigzag stitch pattern as shown in FIG. 1(A) is selected instead of the tulip, the flip-flop FF1 is not set, and the switch signal supplied to the switch circuit SL is always 1. The switch circuit provides the needle amplitude control signal DB from the memory ROM1 to the processor PVA1. This processor executes processing with the formula "(DB−15)×KB+15" for the zigzag stitch pattern and converges it to M basic line in response to the decrease of the contraction factor KB. For the straight stitch, since the needle amplitude signal DB in the aforementioned operation formula is 15, it always a result of 15 to specify M basic line.

In the formation of these three stitch patterns independent of one another, the switch SW2 is not operated, and the flip-flop FF2 is not set. Therefore, the straight stitch is always controlled on M basic line.

When an inversion switch SW4 is operated in the designation of the combination pattern of the tulip pattern and straight stitch pattern, the flip-flop FF2 is set, and for the formation of each unit stitch pattern the inversion signal TD causes the processor PVA1 to execute processing for "$\overline{DB}=30-DB$" where $\overline{DB}$ is the inverted pattern control signal. The operation formula for the tulip is "{(30−DB)−15}×KB+15", and the tulip shown in FIG. 1(B) is inverted and converged to M basic line. For the straight stitch, "DB=0" in combination with the tulip in the aforementioned formula, that is for this portion is "(30−15)×KB+15". The result is thus 30 when the contraction factor KB is 1, and is 15 when the contraction factor KB is 0. In the former case, the basic line coincides with R basic line with co-ordinate 30 obtained with the inversion of the tulip in FIG. 1(B). In the latter case, the basic line coincides with the M basic line.

In the formation of these three inverted stitch patterns, the flip-flop FF2 is not set, and the straight stitch is always controlled on the M basic line.

As has been described, the basic line for the straight stitching is controlled to M basic line, with which the ordinary sewing operation can be carried out most readily and conveniently and the co-ordinate of the basic line for the straight stitching is specified in dependence upon the peculiarity of the pattern or patterns combined with the straight stitch to form a combination stitch pattern. Thus, various combination stitch patterns can be formed with good appearance.

We claim:

1. An electronic sewing machine substantially comprising; a first memory storing stitch control data for different stitch patterns including a pattern of straight stitches, pattern selecting means including a number of pattern selecting switches selectively operated to produce a pattern signal designating the corresponding one of the patterns stored in the first memory, pattern memory control means operated to determine a combination of different patterns including the straight stitches, a second memory operated in response to the operation of the pattern selecting switches and of the pattern memory control means to memorize the combination of different patterns in a predetermined sequence, a third memory storing group signals for dividing the different patterns into a predetermined number of groups and produce a group signal at the time of production of a pattern which belongs to a group, register means receiving the group signals of the third memory to register one of the group signals in accordance with the sequence of the patterns to be produced in combination, thereby to determine the stitch co-ordinates of the straight stitches, and calculating means operated in response to the stitch control signal of the first memory and the output signal of the register means to convert the stitch control signal of the straight stitches into the stitch co-ordinates determined by the group signal of the register means.

* * * * *